(12) United States Patent
Tillotson

(10) Patent No.: US 9,514,170 B1
(45) Date of Patent: Dec. 6, 2016

(54) PRIORITY QUEUE USING TWO DIFFERENTLY-INDEXED SINGLE-INDEX TABLES

(71) Applicant: Amazon Technologies, Inc., Reno, NV (US)

(72) Inventor: Paul John Tillotson, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 464 days.

(21) Appl. No.: 13/895,143

(22) Filed: May 15, 2013

(51) Int. Cl.
*G06F 17/30* (2006.01)

(52) U.S. Cl.
CPC ................................ *G06F 17/30321* (2013.01)

(58) Field of Classification Search
CPC .............................................. G06F 17/30321
USPC ........................................................ 707/741
See application file for complete search history.

(56) References Cited

U.S. PATENT DOCUMENTS

| | | | |
|---|---|---|---|
| 4,965,716 A | 10/1990 | Sweeney | |
| 5,850,538 A | 12/1998 | Steinman | |
| 5,956,714 A | 9/1999 | Condon | |
| 6,003,101 A | 12/1999 | Williams | |
| 6,058,389 A * | 5/2000 | Chandra | G06F 17/30321 |
| 6,708,166 B1 * | 3/2004 | Dysart et al. | 707/765 |
| 6,728,792 B2 | 4/2004 | Wagner | |
| 8,522,192 B1 * | 8/2013 | Avalos | 717/100 |

| | | | |
|---|---|---|---|
| 2002/0154040 A1 * | 10/2002 | Vataja | H03M 7/30 341/50 |
| 2006/0136448 A1 * | 6/2006 | Cialini | G06F 17/30306 |
| 2008/0130668 A1 * | 6/2008 | Balakrishnan et al. | 370/412 |
| 2012/0307628 A1 * | 12/2012 | Maeda et al. | 370/225 |
| 2014/0081934 A1 * | 3/2014 | Mizell | G06F 17/30348 707/696 |
| 2014/0258264 A1 * | 9/2014 | Bestgen et al. | 707/715 |

FOREIGN PATENT DOCUMENTS

CN 1979424 A * 6/2007

OTHER PUBLICATIONS

"Amazon DynamoDB FAQs" downloaded Apr. 9, 2013 from aws.amazon.com/dynamodb/faqs/#What_is_provisioned_throughput, pp. 1-10.

* cited by examiner

*Primary Examiner* — Tarek Chbouki
(74) *Attorney, Agent, or Firm* — Robert C. Kowert; Meyertons, Hood, Kivlin, Kowert & Goetzel, P.C.

(57) ABSTRACT

Methods and apparatus for efficient priority queues using single-index tables are disclosed. In response to a request to generate an instance of a priority queue using a database that permits no more than one index per table, an identifier-indexed table and a priority-indexed table are set up. In response to a request to insert a queue entry with a given identifier and a given priority, one tuple is inserted into each table. In response to a request to remove an entry with a specified identifier, a tuple with the specified identifier is removed from the identifier-indexed table, while the removal of the corresponding tuple from the priority-indexed table may be deferred.

21 Claims, 9 Drawing Sheets

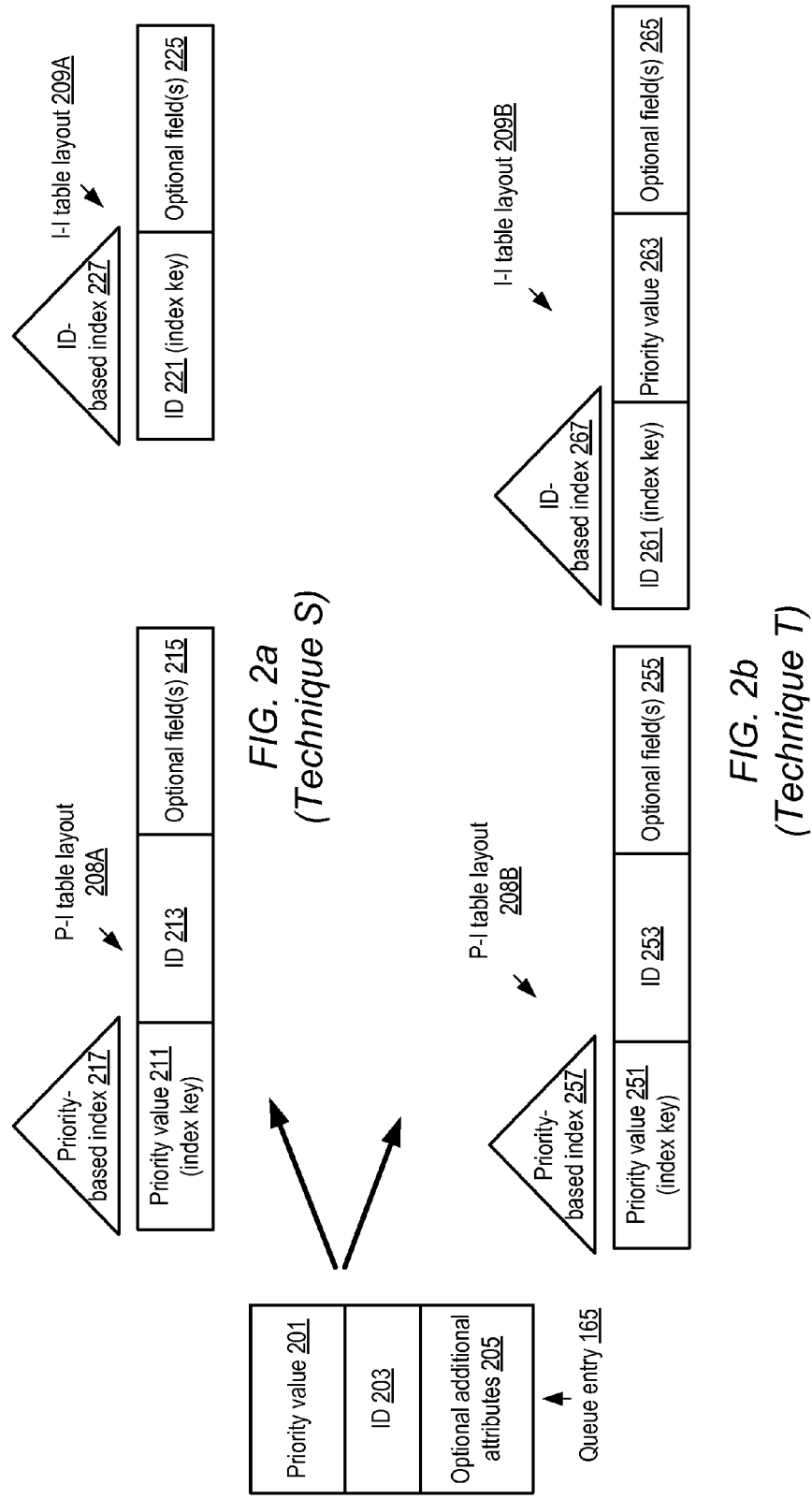

| Operation 301 | Technique S: Priority-indexed table tuples include priority and ID fields; ID-indexed table tuples do NOT include priority 303 | Technique T: Priority-indexed table tuples include priority and ID fields; ID-indexed table tuples also include ID and priority fields 305 |
|---|---|---|
| INSERT: insert entry with specified (ID, priority) 311 | 1 write to P-I table + 1 write to I-I table 313 | 1 write to P-I table + 1 write to I-I table 315 |
| REMOVE-BY-ID: Remove entry with specified ID 321 | Immediate: 1 write to I-I table + Deferred: (1 read from P-I table + 1 write to P-I table + 1 read from I-I table) 323 | 1 read from P-I table + 1 write to P-I table + 1 write to I-I table 325 |
| RETRIEVE-HIGHEST-PRIORITY: Retrieve ID of entry with highest priority (or specified priority) 331 | 1 read from P-I table + 1 read from I-I table 333 | 1 read from P-I table 335 |
| REMOVE-HIGHEST-PRIORITY: Remove entry with highest (or specified) priority 341 | Cost of ((RETRIEVE-HIGHEST-PRIORITY)+(REMOVE-BY-ID)) 343 | |

PRIORITY QUEUE USING TWO DIFFERENTLY-INDEXED SINGLE-INDEX TABLES

BACKGROUND

Priority queues are utilized for a number of important computer-based applications. For example, worker threads of a large scale distributed computation may be configured to periodically retrieve the highest-priority task among the tasks currently placed in a prioritized work queue, remove the highest-priority task from the queue and perform the corresponding work operations. The tasks may be prioritized and placed into the work queues as needed by schedulers or task generators that operate independently of, and asynchronously with respect to, the worker threads. Such operational models may be used at various task granularities, from long-lasting data transfer jobs to medium-scale software development/deployment tasks to relatively short computations or analysis tasks.

The types of operations typically supported for priority queues may include, for example, queue creation and deletion, insertion of a new queue entry with a corresponding entry identifier and priority value, removal of an entry with a specified identifier, removal of an entry based on a priority criterion (e.g., an entry with the currently highest priority, or with a specified priority), and retrieval of entries based on various criteria for identifiers and/or priorities. Some queue-based applications may have additional requirements, such as cost constraints, consistency/integrity requirements, and the like.

A number of different underlying techniques may be used to implement priority queue mechanisms, depending, for example, on the infrastructure technologies (e.g., the various types of storage systems or database systems) available and the costs involved. In some naïve implementations of priority queues, the costs of doing some of the types of common queue operations (e.g., the number of reads and writes required for a given operation, which may translate directly or indirectly into client costs) may be dependent on the number of entries in the queue. For many applications, however, the number of entries that a given priority queue may have to hold is not easily predictable, and queue sizes may in some cases be expected to grow over time. In such scenarios, therefore, clients interested in priority queue services may wish to utilize implementations in which the costs of doing typical queue operations are low and, as far as possible, independent of the number of queue entries.

BRIEF DESCRIPTION OF DRAWINGS

FIG. 2a and FIG. 2b illustrate respective examples of table layouts for two approaches to implementing priority queues using single-index database tables, according to at least some embodiments.

FIG. 3 illustrates example I/O operation counts for implementing various types of priority queue operation, according to at least some embodiments.

Figure 1:
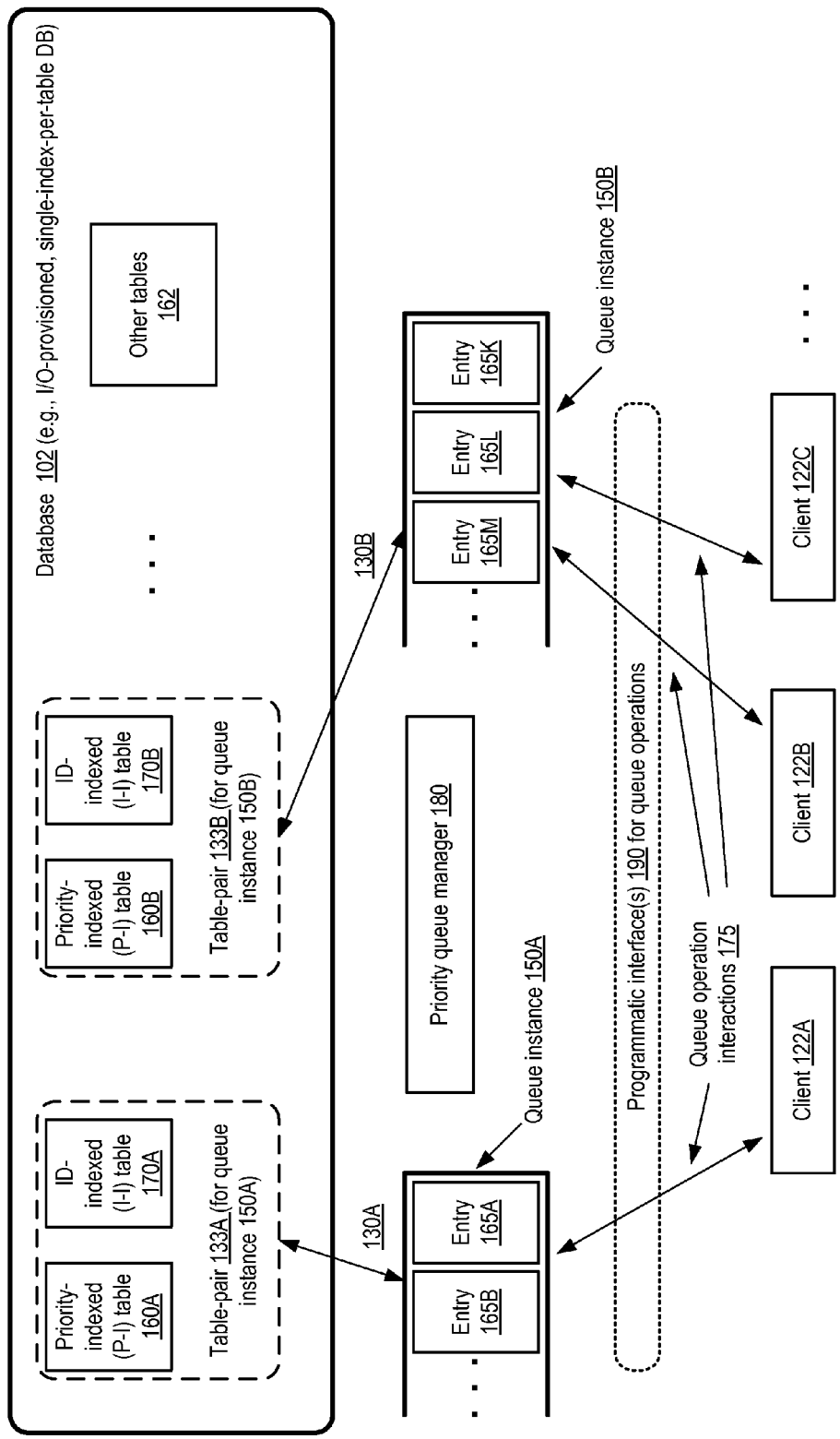
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing efficient priority queues using single-index tables are described. The term "priority queue" or "priority queue instance" may be used herein to refer to a logical entity that includes one more entries, where each entry has at least a respective identifier and a respective priority relative to other entries, and where the queue supports at least the following types of operations: (a) insertion of an entry with a specified identifier and a specified priority (b) removal of an entry with a specified identifier and (c) retrieval of the identifier of the entry with the highest priority in the queue. (These three operation types may be referred to herein as "INSERT", "REMOVE-BY-ID" and "RETRIEVE-HIGHEST-PRIORITY" operations.) Priority queue instances may offered as part of a network-accessible service (such a multi-tenant or a single-tenant service) in some embodiments, and clients of the priority queue service may be enabled to customize their queue instances (e.g., by selecting among various implementation choices that provide different tradeoffs between storage and computation costs, as described below). The term "priority queue mechanism" as used herein may refer to the underlying algorithmic design and infrastructure used for a given implementation; each priority queue mechanism may be used to create numerous priority queue instances at client request. One or more priority queue mechanisms may be supported in a given embodiment.

In at least some embodiments, the contents of a given entry in a priority queue may include more than just a priority and identifier. For example, in one embodiment in which clients use priority queues for managing work tasks, a data object representing details of the work to be performed for a given task may be included in the corresponding queue entry. Furthermore, in some embodiments, in addition to the INSERT, REMOVE-BY-ID and RETRIEVE-HIGHEST-PRIORITY operation types, other operation types may be supported as well, such as operations to remove an entry in accordance with a priority criterion (e.g., to remove an entry with the highest priority, or to remove an entry with a specified priority), or to retrieve the identifier of an entry based on a priority criterion. In one embodiment, respective programmatic interfaces (e.g., application programming interfaces or APIs) may be implemented to support each of the operation types. Programmatic interfaces that combine some set of simpler operation interfaces into a single interface invocation may be supported in some implementations as well—e.g., an operation to change the priority of a given entry with a specified identifier may be supported by an API call that performs a REMOVE-BY-ID operation followed by an INSERT operation for an entry with the same identifier and a changed priority value.

In at least some embodiments, a priority queue mechanism may utilize a database system to store contents of the queue entries. In some embodiments, a database system that supports no more than one index per table may be used—that is, while a given tuple or row in a table may comprise a plurality of fields/columns, only one of the fields may be used as the key for an index on the table. Such a database system may be referred to herein as a single-index-per-table database, and the tables in such a database system may be referred to herein as single-index tables. Single-index-per-table databases may be especially prevalent in scenarios in which it is permissible for different tuples of a table to include different sets of fields. For example, in one non-relational database system, a given tuple T1 of a table Table 1 may include values for fields (userid, name, address), while another tuple T2 of the same table may include values for a different set of fields (userid, name, address, phone), and yet another tuple T3 may only include a userid value. In this example scenario, only the "userid" field may be required for a tuple to be valid, and the only index allowed or supported may be an index on userid.

A category of database systems called "provisioned-input-output" or "provisioned-I/O" databases may be used for priority queues in some embodiments. In a provisioned-I/O database, as the term is used herein, an operation supported by the database may be characterized by the number of reads and writes (i.e., I/Os) that have to be performed on the underlying persistent storage device(s) being used for the database. Thus, for example, a given logical operation O1 may be characterized as requiring two reads and two writes (some of which may be directed to different tables), while a different logical operation O2 may be described as requiring one read and one write. In at least some embodiments, the financial cost to a client of a provisioned-I/O database may be proportional to the number of reads and/or writes performed on behalf of the client. In some embodiments, the costs of reads may in general differ from the costs of writes, while in other embodiments, reads and writes may have equal costs. In at least one embodiment in which indexes are used, reads and writes on index entries may not be included when computing or estimating the total number of reads or writes for a given operation, since indexes are generally cached in memory and thus index I/O operations often do not involve I/O to persistent storage. In some embodiments, priority queue entries may be implemented using a single-index-per-table database that is also a provisioned-I/O database. In other embodiments, priority queues may be implemented using either a single-index-per-table database that is not a provisioned-I/O database, a provisioned-I/O database that is not a single-index-per-table database, or using a database that is neither a provisioned-I/O database nor restricted to one index per table.

According to one embodiment, in response to a request to generate an instance of a priority queue using a provisioned-I/O database that permits no more than one index per database table, a queue management system of one or more computing devices may configure two tables in the database: an identifier-indexed table (i.e., a table whose only permitted index uses queue entry identifiers as keys) and a priority-indexed table (i.e., a table whose only permitted index uses priority values as keys). Identifier-indexed tables may be referred to herein as I-I tables, and priority-indexed tables may be referred to as P-I tables. Each queue entry of the instance may be represented by a pair of tuples in such an embodiment, comprising a tuple in the I-I table and a tuple in the P-I table. In response to a request to insert a queue entry into the instance (e.g., a request for an INSERT operation as described above), one tuple (which includes at least an identifier field) may be inserted into the I-I table, and one tuple (which includes at least a priority field and an identifier field) may be inserted into the P-I table. The indexes for both tables may also be updated accordingly—e.g., the identifier-based index on the I-I table, and the priority-based index on the P-I table, may be updated to reflect the new entry.

In response to a request to remove an entry with the specified identifier (e.g., a request for a REMOVE-BY-ID operation as described above, specifying the identifier ID-k), the system may thus need to eventually remove a respective entry from both tables (the I-I table and the P-I table being used for the instance) in such embodiments. The manner in which REMOVE-BY-ID operations are implemented may differ in different implementations, depending for example on the contents of the tuples in the I-I table. In one space-efficient approach (referred to herein as "technique S", for "space-efficient"), a tuple in the I-I table may be considered valid if it contains only the identifier of the corresponding queue entry; thus, there may be no requirement for the I-I table to contain any other fields than the identifier field. In another approach, which may utilize more storage space for the I-I table but may simplify and/or reduce the number of operations (and hence the time required) for some queue operations relative to technique S as described below, each row in the I-I table may be required to include both an identifier field and a priority field. The latter approach, in which tuples of the I-I table include identifier fields as well as priority fields, may be referred to herein as "technique T", for "time-efficient". In some embodiments, a given priority queue system may implement both technique S and technique T—e.g., some queue instances may use technique S, while others may use technique T, or a decision may be made at run-time as to whether to use technique S or technique T for a given queue instance. In one embodiment, the choice of technique may be based on client preferences or client specifications (e.g., if a particular client C1 wishes to minimize latency and is willing to pay for more storage, technique T may be used for a queue instance for C1; while if a client C2 is less willing to pay for storage, and is willing to accept slightly longer latencies for some operations, technique S may be used). It is noted that the names "technique S" and "technique T" are used herein primarily to help with the ease of presentation, and that either technique may be sufficiently space-efficient and time-efficient for the vast majority of clients in at least some embodiments—e.g., the differences in space usage and/or operation costs associated with queue operations may be very small compared to the other tasks being performed using the queues.

If technique T is being used for a given priority queue instance in one embodiment, and a REMOVE-BY-ID request is received, the tuple T1 corresponding to the specified identifier ID-k in the I-I table may contain a priority value P-k that can be used to identify (using an index lookup) the tuple T2 to be removed from the P-I table. Accordingly, an index lookup into the I-I table may result in a straightforward identification of both tuples to be deleted, and both tuples T1 and T2 thus identified may be removed from their respective tables in such an embodiment.

If technique S is being used, tuple T1 may be identified using key ID-k and the identifier-based index of the I-I table, but the identification of tuple T2 may not be so straightforward. As the only available index on the P-I table uses priority rather than the identifier as the key, and the priority value P-k is not available from T1 in technique S, index-based lookups cannot be used to efficiently identify T2. Accordingly, in some embodiments, in response to a REMOVE-BY-ID request, the queue management system may be configured to (a) perform the removal of the T1 tuple from the I-I table and (b) defer the removal of the T2 tuple from the P-I table. In one embodiment, the removal of T2 may be deferred until (a) a RETRIEVE-HIGHEST-PRIORITY request leads to the identification of T2 as the tuple with the highest priority in the P-I table, and (b) a check to determine whether the I-I table contains a corresponding entry to T2 (i.e., T1, with the same identifier ID-k that the identifier field of T2 contains) reveals that T1 was already removed. If the prior removal of T1 is thus deduced, T2 may be removed from the P-I table, and the entry T3 (with identifier ID-1) in the P-I table that now (i.e., after T2's removal) has the highest priority may in turn be a candidate for the response to the RETRIEVE-HIGHEST-PRIORITY request. Just as the I-I table was checked to validate that T1 had not been removed, the I-I table may now be checked again to validate that the tuple with identifier ID-1 was not removed previously. If the I-I table does not contain an entry with identifier ID-1, this may constitute evidence that T3 should also be removed (as its counterpart tuple in the I-I table no longer exists), and T3 may be removed accordingly in such an embodiment. This process of identifying the tuple corresponding to an apparent highest-priority entry, and checking for previous removals in the I-I table, may be repeated until a tuple is found in the I-I table for the current apparent highest-priority entry as indicated by the P-I table. Only after the queue management system validates that a corresponding tuple exists in the I-I table would the corresponding identifier be provided to the requesting client in such an embodiment. Thus, the deferring of the removal of tuples from the P-I table may impact the apparent cost (in reads and writes) of the RETRIEVE-HIGHEST-PRIORITY operations in embodiments in which technique S is used. Further details regarding cost analysis for various types of queue operations is provided below in the context of the description of FIG. 3.

In at least some embodiments, as mentioned above, both techniques S and T may be used, or a hybrid technique encompassing aspects of both approaches may be used. In one such embodiment, for example, when a REMOVE-BY-ID request for a queue entry with identifier ID-k is received, the contents of the T1 tuple with identifier ID-k in the I-I table may be examined to determine whether T1 contains information (such as a priority field) that can be used to access, using an index lookup, or less than a threshold number of reads, the tuple T2 to be deleted from the P-I table. The threshold number may be some small number N of reads that is not directly proportional to the total number of tuples in the P-I table; for example, an index-based lookup may be expected to require substantially fewer reads than a table scan may require. If T1 does contain such information (e.g., if an approach similar to technique T is employed for at least T1, in that T1 includes a priority value or some other pointer to efficiently access T2), then T1 and T2 may be removed from the I-I table and the P-I table respectively. If T1 does not contain such information usable to identify or access T2, T1 may be removed from the I-I table, but the removal of T2 may be deferred in such an embodiment (e.g., until, as described above a RETRIEVE-HIGHEST-PRIORITY request leads to the identification of T2's entry as the apparent highest-priority entry, but a check of the I-I table indicates that T1 was removed earlier, and consequently T2 is removed).

In some embodiments, the check as to whether a corresponding I-I table tuple was removed may also or instead be performed in response to other types of requests than RETRIEVE-HIGHEST-PRIORITY requests. For example, in one embodiment, a RETRIEVE-BY-PRIORITY request may be supported in which the identifier of a queue entry based on a specific priority value (e.g., rather than the highest priority) may be retrieved at client request. In response to a RETRIEVE-BY-PRIORITY request that specifies a particular priority value, the queue management system may look up a tuple in the P-I table with the specified priority, and validate that a corresponding tuple in the I-I table exists with the same identifier, before returning the identifier to the requesting client. If no corresponding tuple exists in the I-I table, the entry in the P-I table may be removed. Deferred removals of the tuples from the P-I table, similar to those described above, may be performed in response to RETRIEVE-BY-PRIORITY requests (e.g., in addition to RETRIEVE-HIGHEST-PRIORITY requests) in some embodiments.

The queue management system may in some embodiments be configured to ensure that each priority value assigned to a tuple (in either the P-I table or the I-I table) is unique with respect to the priority values of other tuples. For example, from the clients' point of view, in some embodiments the queue entries may at least initially be given priorities from among a discrete set of priority levels, such as priority levels 1, 2, 3, 4 and 5, with level 1 being the lowest priority and level 5 being the highest priority. The queue management system may, in such an embodiment, concatenate a unique timestamp value (or a sequence number that is incremented upon each use) with the priority level to obtain a unique priority value to be used in the database tables. Thus, in one scenario, a priority field may be configured to be 32 bits wide, with the first 8 bits used for a priority level encoding, and the remaining 24 bits used for a unique sequence number or timestamp. Other data may be encoded within the priority field as well in some embodiments, such as portions or all of the identifier of the queue entry, a client identifier, and so on. In some embodiments, a unique string (not necessarily based on a timestamp or a sequence number) may be generated for use as part of the priority value to be stored internally by the priority queue service.

System for Priority Queue Management

FIG. 1 illustrates an example system environment, according to at least some embodiments. As shown, system 100 may include a priority queue manager 180 of a priority queue service configured to provide a set of programmatic interfaces 190 for queue operations (such as queue instance creation operations, INSERT operations, REMOVE-BY-ID operations, RETRIEVE-HIGHEST-PRIORITY operations and the like) requested by clients 122, such as client 122A, 122B and 122C. At client request, the priority queue manager 180 (which may be referred to herein as queue manager 180) may create respective pairs of tables within a database 102 corresponding to each queue instance 150 (such as queue instance 150A or queue instance 150B). In the depicted embodiment, table pair 133A comprising a priority-indexed (P-I) table 160A and an identifier-indexed (I-I) table 170A has been set up for queue instance 150A (as indicated by arrow 130A), while table-pair 133B comprising P-I table 160B and I-I table 170B has been created for queue instance 150B (as indicated by arrow 130B). The database 102 may include various other tables 162 in some embodiments, e.g., for purposes other than queue management. In at least some embodiments, access to queue instances 150 may be managed as an I/O-provisioned network-accessible multi-tenant or single-tenant service, in which the costs to clients 122 of using the service may be proportional to the number of reads and/or writes performed to implement the queue operations requested in interactions 175. In some embodiments, the database 102 may limit the maximum number of indexes that can be created on a table to one (i.e., a single-index-per-table database may be used). Independently of whether the maximum number of indices per table is limited or not, the database 102 itself may be managed as an I/O-provisioned system in some embodiments (i.e., database operations may be characterized and/or billed using the number of reads/writes required for them). Thus, in one embodiment, a single-index-per-table, I/O-provisioned database 102 may be used for the priority queue service. In at least one embodiment, the priority queue manager 180 may be implemented as a collection of software and/or hardware components, and/or may be distributed across several computing devices. In one embodiment, the priority queue manager 180 may represent a component or extension of the database management system for database 102: for example, programmatic interfaces 190 may be implemented as a library available as an add-on component to other database management libraries.

At a given point in time, a given queue instance 150 may comprise some number of queue entries 165. For example, queue instance 150A is shown with two entries 165A and 165B, while queue instance 150B is shown with three entries 165K, 165L and 165M. The entries 165 may represent logical entities backed by physical data stored in the tuples of the corresponding table pairs 133. Conceptually, each entry may comprise an associated unique identifier, an associated priority value, and zero or more additional attributes or fields (such as details on the nature of the work to be performed, in scenarios in which the entries represent units of work to be performed). One or more physical representations of the identifier and/or the priority value may be stored in tuples of the I-I table and the P-I table in the depicted embodiment. For example, in one implementation (corresponding to technique S as described above), each tuple of a P-I table 160 may comprise at least a priority value for a corresponding entry 165 and an identifier for the entry 165, while each tuple of an I-I table 170 may comprise at least the identifier for the entry 165. In a different implementation (corresponding to technique T as described above), the P-I tables 160 may be configured in the same way as in technique S, while tuples of I-I tables may include both the identifier and the priority value of the corresponding entry 165. In some embodiments, the priority queue manager 180 may be configured to implement a combination of these two approaches, in which for example some queue instances 150 may use I-I tables that include priority values, while other queue instances 150 may use I-I tables that do not include priority values.

When a client request to perform a queue operation on a given instance 150 is received (e.g., as part of a queue operation interaction 175), the priority queue manager 180 may translate the request into one or more underlying read and/or write operations on one or both tables of the table-pair 133 corresponding to the instance 150. The specific reads and/or writes performed for various types of operation are described below for several implementation techniques, and the number of reads and writes needed for the operation types are shown in FIG. 3. In general, less storage may be used for technique S implementations than for technique T implementations, because priority values may not be stored in the I-I tables in technique S The smaller storage cost may, however, be accompanied by slightly higher average costs for some operations (such as REMOVE-BY-ID or RETRIEVE-HIGHEST-PRIORITY) in technique S than technique T. Thus, storage costs for queue management may be traded off against operation costs in at least some embodiments. In addition, factors related to data consistency and/or normalization may come into play when deciding between technique S and technique T—for example, some implementations of technique T may require that the queue manager 180 ensures that the priority value from the P-I table tuple is replicated in a consistent manner in a corresponding tuple of the I-I table. Ensuring such consistency may involve additional costs (e.g., imposition of some approximation of commit semantics or transaction boundaries) that may offset the savings for REMOVE-BY-ID and RETRIEVE-HIGHEST-PRIORITY queue operations.

Example Table Organizations

FIG. 2a and FIG. 2b illustrate respective examples of table layouts for two approaches to implementing priority queues using single-index database tables, according to at least some embodiments. As shown, a queue entry 165 of a priority queue instance 150 may include at least a priority value 201 and an ID (identifier) 203 in the depicted embodiment; optionally, additional attributes 205 may be included as well. The priority queue instance 150 and its entries 165 may be considered logical constructs whose contents are stored physically on persistent storage using tuples within a pair of single-index tables of a database 102.

FIG. 2a shows one example organization (termed "Technique S") of the priority-indexed table 160 and the identifier-indexed table 170, which optimizes for space usage by storing priority values in just the P-I table 160 and not in the I-I table. According to P-I table layout 208A, in technique S, each P-I table tuple includes a priority value 211 and an ID 213. Optional fields 215 (e.g., fields that represent various attributes 205 of queue entries 165) may also be included in some embodiments. Priority values 211 serve as index keys for priority-based index 217. In at least some embodiments, each priority value 211 may be unique, i.e., no duplicates may be allowed for the priority values stored in the database. In some cases, where for example clients may initially assign discrete priorities selected from a small set of priority levels to the queue entries 165, the queue manager 180 (or some other component of the priority queue service or system) may be responsible for transforming the (potentially duplicate) discrete priority levels into unique priority values. For example, the assigned priorities may be concatenated with unique random strings or with timestamps or sequence numbers indicative of when the corresponding entries 165 were generated, so that the priority values 211 used in the database all differ from one another while still representing the relative importance of the different assigned priority levels. The use of timestamps or sequence numbers that are incremented upon use may help introduce a secondary priority mechanism in which, within a given priority level, different entries 165 are prioritized based on the sequence in which the entries were created (or the order in which the corresponding client requests to create the entries were received).

As also shown in FIG. 2a, according to I-I table layout 209A, only an ID field 221 may be required for I-I tables 170 in technique S, although additional fields 225 may be included optionally (e.g., to represent some subset or all of the attributes 205). IDs 221 may serve as keys for index 227 in the depicted embodiment. In some embodiments, when a client submits an INSERT request for an entry 165, the ID 203 may not necessarily be unique relative to the other IDs already included in the entries of the queue instance. In such a scenario, the queue manager 180 may be responsible for converting the ID value supplied by the client to a unique ID value for storage in the database. Techniques similar to those used for ensuring that priority values 211 are unique may be employed—e.g., the ID supplied by the client may be concatenated with unique random strings, timestamps or sequence numbers to arrive at the ID values 213 and 221.

In technique T, as shown in FIG. 2b, the layout 208B of the P-I table may be similar to the P-I table layout of technique S—e.g., each tuple in the P-I table may have a priority value 251 used as a key for priority-based index 257, an ID field 253 and zero or more optional fields 255. However, the I-I table layout 209B may differ from the I-I table layout of FIG. 2a in that, in addition to an ID field 261 that servers as a key for ID-based index 267, a priority value 263 may also be required. As in the case of the I-I table layout for technique S, zero or more optional fields 265 may also be stored in the I-I table tuples. The presence of the priority values 263 may be helpful in simplifying the REMOVE-BY-ID operations of technique T, relative to technique S, as described below. It is noted that at least in some embodiments, not all the tuples of a given table (in either technique S, technique T, or both) may have the same set of fields—e.g., some tuples within an I-I table may have more optional fields than other tuples in the same I-I table, and similarly, some tuples within a given P-I table may contain different fields than other tuples within that same P-I table.

I/O Operation Counts

FIG. 3 illustrates example I/O operation counts (e.g., the number of reads and writes to the database tables) for implementing various types of priority queue operation, according to at least some embodiments. Several types of queue operations are listed in the column whose header ("Operation") is shown in element 301 of FIG. 3, and the corresponding operation counts are shown for technique S and technique T in the remaining columns of FIG. 3. As indicated in respective header elements 303 and 305, in technique S, the I-I table tuples are not required to include priority values, while in technique T, I-I table tuples do include priority values that can be used for index lookups on the P-I tables. P-I table tuples have similar formats (including both priority values and IDs) in both techniques S and T.

For INSERT operations, in which clients request an insertion of an entry with a specified ID and priority value (element 311), the queue manager 180 performs one write to each of the tables (the P-I table and the I-I table), regardless of whether technique S is being used (element 313) or technique T is being used (element 315). Note, however, that the amount of data written may be large in technique T than in technique S (since the priority value has to be written to the I-I table in technique T, but not in technique S). In many database systems, however, the additional costs of adding the priority values may typically be quite small. Thus, the I/O costs of INSERTs do not differ substantially for the two techniques S and T in the depicted embodiment.

For REMOVE-BY-ID operations (element 321), the computation of the number of I/Os performed is relatively straightforward for technique T (element 325). Using the specified ID, the queue manager 180 identifies and reads the tuple T1 of the I-I table that is to be removed/deleted, and using the priority value stored in T1, the queue manager can use P-I's index to identify the tuple T2 of the P-I table that is to be deleted. Thus, both of the tuples to be deleted can be identified using a respective index (no table scans or other potentially long operations are required). Accordingly, the REMOVE-BY-ID operation translates to one read from the I-I table, followed by one write (i.e., a delete) to each table.

However, in technique S (element 323), an index lookup of tuple P2 may not be feasible in response to a REMOVE-BY-ID request, as the I-I table does not include priority values. Accordingly, in technique S in the depicted embodiment, while the write (delete) to the I-I table to remove tuple T1 may be immediate, the delete of tuple T2 from the P-I table may be deferred (element 323), e.g., until a RETRIEVE-HIGHEST-PRIORITY request is received that results in the determination of T2 as the highest-priority entry's tuple. At the time that such a RETRIEVE-HIGHEST-PRIORITY request is received, the queue manager 180 may check the I-I table to validate that a tuple with the same ID as T2 is present. Since T1 was the only entry that had the same ID as T2, and T1 was removed in the "immediate" part of the response to the REMOVE-BY-ID operation, no such tuple may be found. This absence of a matching tuple in the I-I table may indicate that the deferred part of the REMOVE-BY-ID operation is now to be completed, and accordingly, T2 may be deleted from the P-I table. In the depicted embodiment, an amortization analysis using the accounting method is used to assign some of the costs of the eventual RETRIEVE-HIGHEST-PRIORITY operation that leads to T2's deletion, to the REMOVE-BY-ID operation that was partially deferred. The I/O operation costs of the additional checking required during the eventual RETRIEVE-HIGHEST-PRIORITY operation are thus represented in FIG. 3 by one read each to the P-I table and the I-I table (in the deferred operations corresponding to element 323 for REMOVE-BY-ID). The fourth operation listed in element 323, a write to the P-I table, corresponds to the actual deferred deletion of T2 from the P-I table. Thus, the total cost (including the amortized or deferred components) for REMOVE-BY-ID is four I/Os in the depicted embodiment. It is noted that the extra read and write operations for the deferred portion of REMOVE-BY-ID processing would happen no more than once for a given queue entry (because, for a given ID, only one corresponding tuple is inserted into the P-I table, and so no more than one deferred removal would be required), which is why the extra cost of the deferred removal is captured by a single read to each of the two tables.

In the embodiment shown in FIG. 3, for a RETRIEVE-HIGHEST-PRIORITY operations (element 331 of FIG. 3), in technique S, one read operation on the P-I table (to access the highest-priority tuple using the priority-based index) would be required, followed by one read operation on the I-I table (to verify that the highest-priority tuple of the P-I table still has a corresponding tuple with the same ID in the I-I table) (element 333). Of course, in case the entry in the I-I table was removed previously as part of the immediate operations performed for a REMOVE-BY-ID request, the deferred removal of the P-I table tuple would be performed and the process of reading and verifying would be repeated. However, the costs of such deferred removals have already been accounted for (in element 323 as described above), and, as noted above, the deferred removal costs would be incurred only once per queue entry; hence, costs associated with deferred removals do not need to be represented in element 333. In technique T, there would be no need to verify the existence of tuples in the I-I table (since there are no deferred operations in technique T), and so a RETRIEVE-HIGHEST-PRIORITY entry would take only one read to the P-I table, as shown in element 335. It is noted that the costs in I/O operations of the RETRIEVE-HIGHEST-PRIORITY operation would be the same as the costs of a more general RETRIEVE-BY-PRIORITY operation, in which a client requests the ID of the entry with a specified (not necessarily the highest) priority. Thus, for the general RETRIEVE-BY-PRIORITY operation, in technique S, the same kind of check would have to be performed on the I-I table to check for a previous REMOVE-BY-ID as was described above for a RETRIEVE-HIGHEST-PRIORITY operation.

In some embodiments, a REMOVE-HIGHEST-PRIORITY operation (element 341) may also be supported, in which a client requests the removal from the queue instance of an entry with the highest priority. The cost of such an operation can be computed (as indicated in element 343) by combining the costs of the RETRIEVE-HIGHEST-PRIORITY operation (to obtain the ID of the highest priority entry) and the REMOVE-BY-ID operation (to remove the tuples with the obtained ID from both tables). Thus, for technique S, the cost of REMOVE-HIGHEST-PRIORITY would be 4 reads and 2 writes (the sum of the costs in elements 323 and 333), and for technique T, the cost of REMOVE-HIGHEST-PRIORITY would be one read and two writes (the sum of the costs shown in elements 325 and 335). In at least some embodiments in which a REMOVE-BY-PRIORITY operation is supported, its costs would also be the same as the REMOVE-HIGHEST-PRIORITY costs.

It is noted that from the client perspective, the precise number of writes or reads required for a given operation may not matter very much in at least some embodiments, as long as the number of operations is small and does not increase linearly with the total number of queue entries. In such embodiments, clients may wish to avoid full table scans (whose costs in operations may increase linearly with queue entry counts) in favor of index-based lookups, and both techniques S and T utilize index based-lookups and avoid full table scans. The selection of technique S versus technique T may thus be based on considerations other than performance—e.g., on whether a given client considers the extra storage space required for technique T a sufficient deterrent to prefer the slightly higher operation counts encountered when using technique S. In at least some embodiments, the queue management system (e.g., the queue manager 180) may provide (e.g., at client request or during initial configuration of a queue instance) an explanation or enumeration of the I/O operation counts expected to be incurred for the various queue operations supported in a given implementation.

It is noted that the details of how reads and writes are performed may vary in different databases 102 in some embodiments—for example, some databases may be implemented as "write-once" systems in which a given tuple is never overwritten in place, while other databases may allow overwriting of a given tuple. In one embodiment, multiple replicas may be maintained of each table, which may result in a different number of operations than illustrated in FIG. 3 for at least some queue operations (although the fact that both techniques S and T avoid the use of table scans may still hold).

Methods for Priority Queues

Figure 4:
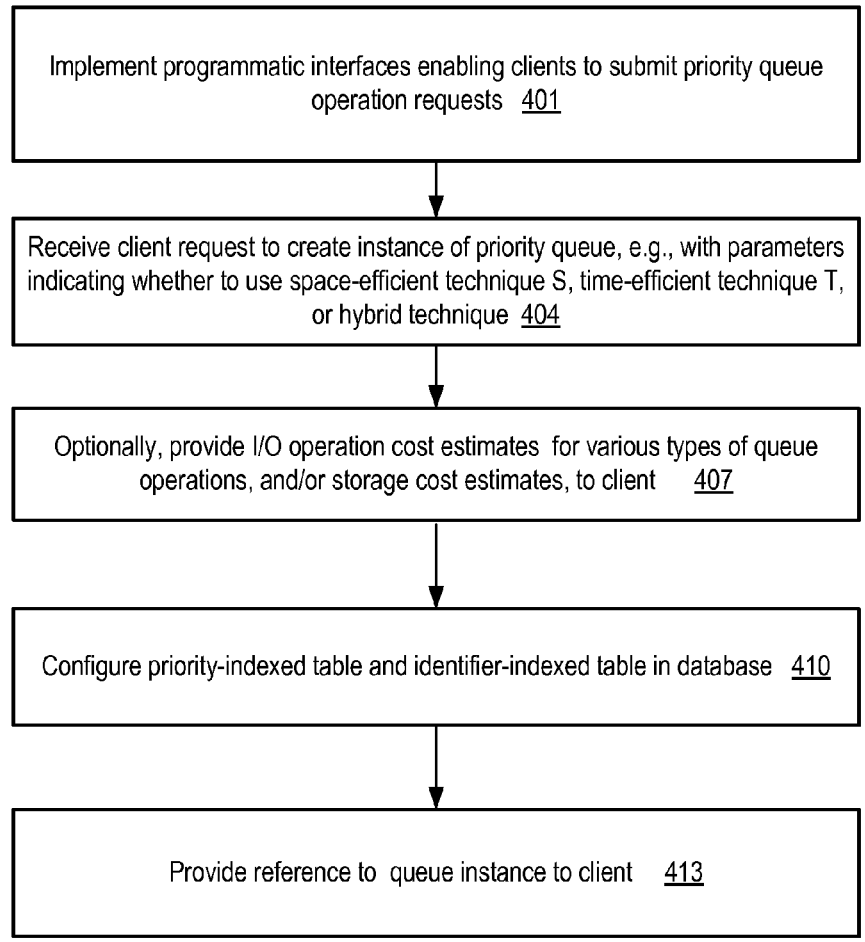
FIG. 4 is a flow diagram illustrating aspects of operations that may be performed to implement a priority queue mechanism using a pair of database tables for a given priority queue instance, according to at least some embodiments.

FIG. 4 is a flow diagram illustrating aspects of operations that may be performed to implement a priority queue mechanism using a pair of database tables for a given priority queue instance, according to at least some embodiments. As shown in element 401, a set of programmatic interfaces 190 may be implemented (e.g., by the queue manager 180) to enable clients to submit various types of priority queue operation requests, such as to create an instance of a priority queue, insert entries, retrieve entries, or remove entries, based on priority criteria, identifier criteria, or some combination of priority and identifier criteria. A request to create an instance may be received (element 404) e.g., by a queue manager 180 using one of the programmatic interfaces 190. In some embodiments, the creation request may indicate via one or more parameters the type of implementation to be used, such as a technique S implementation, a technique T implementation, or a hybrid combining aspects of both technique S and technique T (e.g., in one hybrid approach, some tuples in the I-I table may include priority values while others may not, so that while there is no requirement to store priority values in the I-I table, priority fields are permitted in the I-I table). In one embodiment, the queue manager 180 may be responsible for determining the approach to use, e.g., technique S may be used based on the queue manager's space constraints, or technique T may be used based on an expectation of a need for faster responses to removes and retrieves. In some embodiments, the queue manager 180 may infer the technique to be used, e.g., based on the type of application for which the queue instance is to be deployed, while in other embodiments, clients may indicate the appropriate technique (e.g., by indicating the relative importance of storage space versus execution time, without necessarily being aware of the specific implementation details).

In some embodiments, the queue manager 180 may optionally provide I/O operation cost estimates (such as those illustrated in FIG. 3) for various queue operations and/or storage cost estimates (e.g., indicating how much total database storage space is likely to be used for the queue instance, assuming some maximum number of entries) for a proposed implementation to the client (element 407). If the client wishes to change the proposed implementation based on the cost estimates or the storage estimates, the client may provide an indication accordingly. After a decision regarding the specific technique is reached (or if there is only one technique supported), in the depicted embodiment, the queue manager 180 may set up or configure the two tables in the database (element 410) accordingly: the I-I table and the P-I table. In one embodiment, the information about operation costs may be provided (or confirmed) to the client after the particular implementation (e.g., technique S or technique T) that is to be used is determined. Having set up the table pair 133 to be used for the instance, the queue manager 180 may provide a reference to the instantiated queue instance (such as an instance name) to the requesting client (element 413), enabling the client to proceed with further queue operations.

It is noted that the client may not be provided details regarding the database tables (e.g., the table names or layouts, or the specific technique being used) in at least some embodiments, and may not even be made aware that database tables are being used for implementing the queue mechanism. From the perspective of the client, an instance of a priority queue with a specified name and a set of supported operations supported via one or more client interfaces 190 may be made accessible, and the details of how those operations are implemented may not be of much interest.

Figure 5:
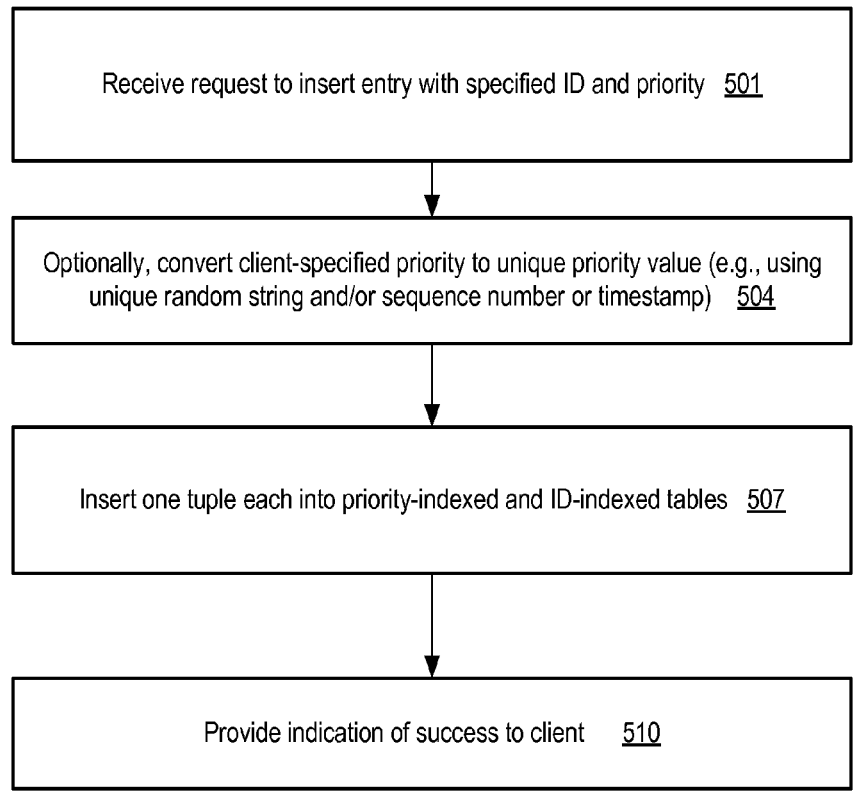
FIG. 5 is a flow diagram illustrating aspects of operations that may be performed to insert a queue entry into a priority queue instance, according to at least some embodiments.

FIG. 5 is a flow diagram illustrating aspects of operations that may be performed to insert a queue entry into a priority queue instance, according to at least some embodiments. As shown in element 501, an INSERT request (i.e., a request to insert an entry with a specified priority and a specified ID) may be received, e.g., by the priority manager 180 via one of the programmatic interfaces 190. In the depicted embodiment, the queue manager 180 may be configured to ensure, as an option, that the priority value that is to be stored in the database is unique (element 504). For example, if a discrete number of priority levels (some of which may potentially be shared by different queue entries) is being used by the client, or some other non-unique priority value is specified by the client, the queue manager 180 may generate a unique compound priority value by concatenating or otherwise combining the priority level with a unique timestamp, sequence number, or random string. The unique compound value rather than the potentially non-unique priority value supplied by the client may be stored in the database tuples (although at least in some embodiments the unique value may not be provided to the client). In at least some embodiments, the queue manager 180 may also be responsible for similarly ensuring that ID values for queue entries are unique—e.g., random strings may be added as suffixes to client-specified IDs if needed. In one embodiment, if a client-specified priority value or ID is modified to ensure uniqueness, the client may be informed accordingly. In some embodiments, uniqueness may not be enforced by the queue manager 180 (e.g., clients may be responsible for providing unique priorities and IDs, and the queue manager 180 may simply report duplicate priority values or duplicate ID values to the client as errors). In some embodiments, either the priority or the ID may not be supplied explicitly by the client, and the queue manager may generate a priority value (e.g., based on the time at which the request is received) and/or a unique ID value, and notify the client accordingly. In some embodiments, unique priority values may not be required.

In the embodiment depicted in FIG. 4, after ensuring the uniqueness of the priority value, one tuple each may be inserted into the P-I and the I-I tables (element 507). The contents of the I-I table tuple may depend on the specific implementation—e.g., for technique T, a priority value may be stored in the I-I tuple, while for technique S, priority values need not be stored in the I-I tuple. After the insertion of the tuples succeeds, a response indicating successful insertion of the queue entry may be provided to the client in some embodiments (element 510). It is noted that in some embodiments, the two tuple insertions may comprise part of a single atomic operation (e.g., transaction semantics may be used to ensure that either both tuples are successfully inserted, or neither tuple is inserted), while in other embodiments, such atomicity may not be required.

Figure 6:
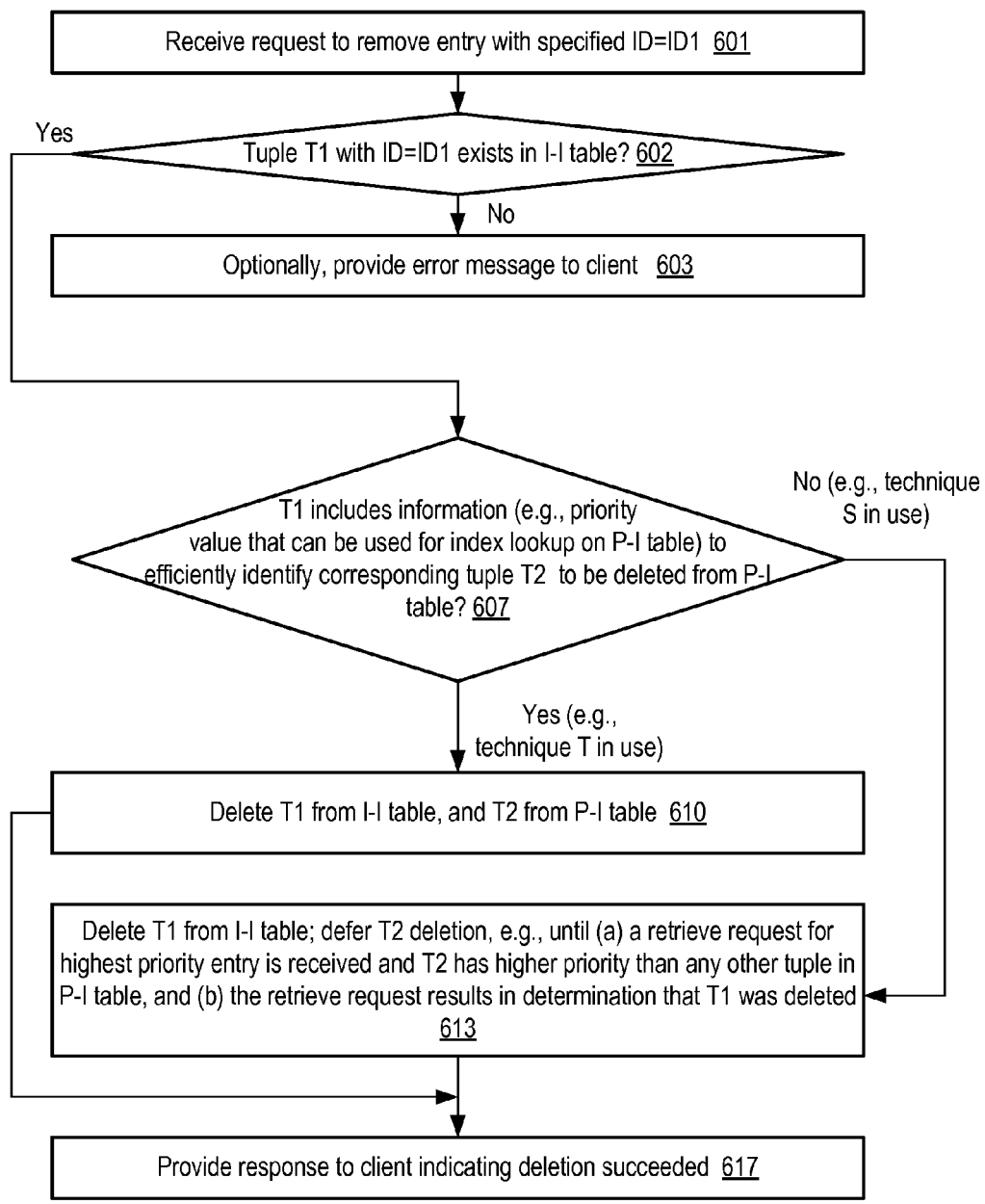
FIG. 6 is a flow diagram illustrating aspects of operations that may be performed to remove a queue entry with a specified identifier from a priority queue, according to at least some embodiments.

FIG. 6 is a flow diagram illustrating aspects of operations that may be performed to remove a queue entry with a specified identifier from a priority queue, according to at least some embodiments. As shown in element 601, a REMOVE-BY-ID request (i.e., a request to remove a queue entry with a specified ID value ID1) may be received, e.g., by a queue manager 180 using one of the programmatic interfaces 190. The queue manager may check (e.g., using the index on the I-I table) whether a tuple T1 with the specified ID exists (element 602) and can therefore be deleted. If no such tuple is found, in some embodiments an error message may be provided optionally to the client (element 603). In one embodiment, an idempotent REMOVE-BY-ID operation may be supported, in which case no error message may be generated if the entry does not exist.

If tuple T1 is identified (as also determined in element 602), in the depicted embodiment the subsequent operations may depend on whether technique S or technique T is being implemented. If T1 contains information (e.g., a priority value for the entry, that can be used for an index lookup on the P-I table) that can be used to efficiently identify the tuple T2 of the P-I table that is to be deleted (as determined in element 607), e.g., if technique T is being used, then both T1 and T2 may be deleted, respectively, from the I-I table and the P-I table immediately (element 610).

If, however, T2 cannot be efficiently found (e.g., if a table scan could be required on the P-I table, which would mean that the number of operations required to find and delete T2 may be proportional to the size of the P-I table), as would be the case if technique S is in use, only T1 may be deleted from the database immediately, and the removal of T2 may be deferred (element 613). In one embodiment, for example, the deletion of T2 would be deferred until (a) a RETRIEVE-HIGHEST-PRIORITY request is received and T2 is found as the tuple with the highest priority in the P-I table and (b) a check of the I-I table reveals that T1 (the tuple with the same ID as T2) was previously removed, thus indicating that T2's deferred removal is required. In another embodiment, in which RETRIEVE-BY-PRIORITY or other retrieval operations based on priority criteria (e.g., retrieval operations in which priority ranges are specified) are supported, a request to retrieve the ID of a queue entry with T2's priority may similarly lead to the discovery (during a verification step involving checking to see that the I-I table contains an entry corresponding to T2) that T1 has already been deleted, and thus would also result in T2 being deleted.

In the embodiment depicted in FIG. 6, the client may be notified that the REMOVE-BY-ID operation succeeded (element 617), whether part of the corresponding set of operations were deferred or not. The client may be so notified, even if the T2 deletion was deferred, because the deferral of the physical deletion from the P-I table does not affect the logical consequences of the REMOVE-BY-ID request from the client's perspective—e.g., after a REMOVE-BY-ID operation is declared successful, the corresponding queue entry can no longer be accessed by clients using the programmatic interfaces 190.

In one embodiment, another approach to deferred deletions from the P-I table may be taken. A cleanup thread or process may be implemented, responsible for periodically examining some subset (e.g., the highest 10% of the P-I table tuples, ranked by priority) or all of the P-I table in such an embodiment, and verifying that corresponding tuples exist in the I-I table. If such a cleanup thread/process finds a tuple Tk in the P-I table with ID Ik, while no entry for Ik can be found in the I-I table, then Tk may be removed from the P-I table.

Figure 7:
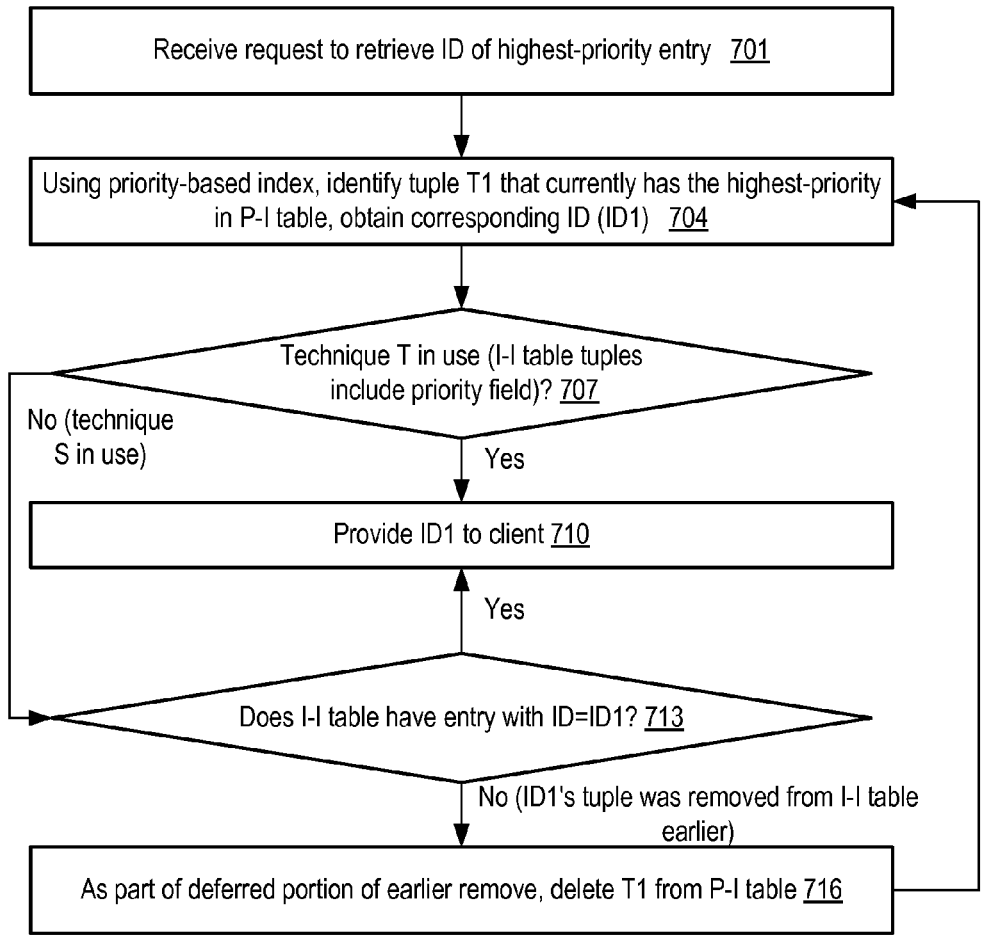
FIG. 7 is a flow diagram illustrating aspects of operations that may be performed to retrieve the identifier of the queue entry with the highest priority among the entries in a priority queue instance, according to at least some embodiments.

FIG. 7 is a flow diagram illustrating aspects of operations that may be performed to retrieve the identifier of the queue entry with the highest priority among the entries in a priority queue instance, according to at least some embodiments. The operations shown in FIG. 7 assume that at least one entry exists in the queue instance at the time that the request is received (so that there is in fact an entry with the "highest" priority). As shown in element 701, a RETRIEVE-HIGHEST-PRIORITY request may be received, e.g., by the priority manager 180 via one of the programmatic interfaces 190. As shown in element 704, the tuple T1 with the highest priority in the P-I table may be identified, and its ID (ID1) may be obtained.

Subsequent operations may depend on the implementation in use, e.g., on whether technique S or technique T is being employed. If technique T is in use, or if tuples in the I-I table contain priority value fields usable to immediately remove corresponding tuples of the P-I table in response to REMOVE-BY-ID requests (as detected in element 707), ID1 may be immediately returned to the requesting client (element 710), as there would be no need to check for any deferred removals. If technique S is in use, e.g., if deferred removals from the P-I table as described above are being implemented (as also detected in element 707), the I-I table may be checked to determine whether a tuple with ID equal to ID1 exists in the I-I table. If such a tuple exists (as detected in element 713), this may confirm that the apparent highest-priority tuple T1 is valid and does not require a deferred removal, and its ID (ID1) may be returned to the requesting client (element 710).

If, however, the check of the I-I table reveals that no corresponding tuple exists in the I-I table (as also determined in element 713), this means that a REMOVE-BY-ID specifying ID1 was received earlier. Accordingly, T1 may be removed from the P-I table as part of a deferred portion of the earlier removal (element 716). At this point, the next highest priority tuple in the P-I table may be processed in the same way as T1 was processed earlier—e.g., the operations corresponding to elements 704 onwards may be repeated for the tuple that now has the highest priority in the P-I table. This processing loop may be repeated (e.g., if there happen to be several deferred removals required for successive tuples found with the highest priority in the P-I table) until the currently highest-priority tuple of the P-I table is found to have a corresponding tuple in the I-I table, in which case the ID of the that tuple would be returned to the requesting client (element 710).

Figure 8:
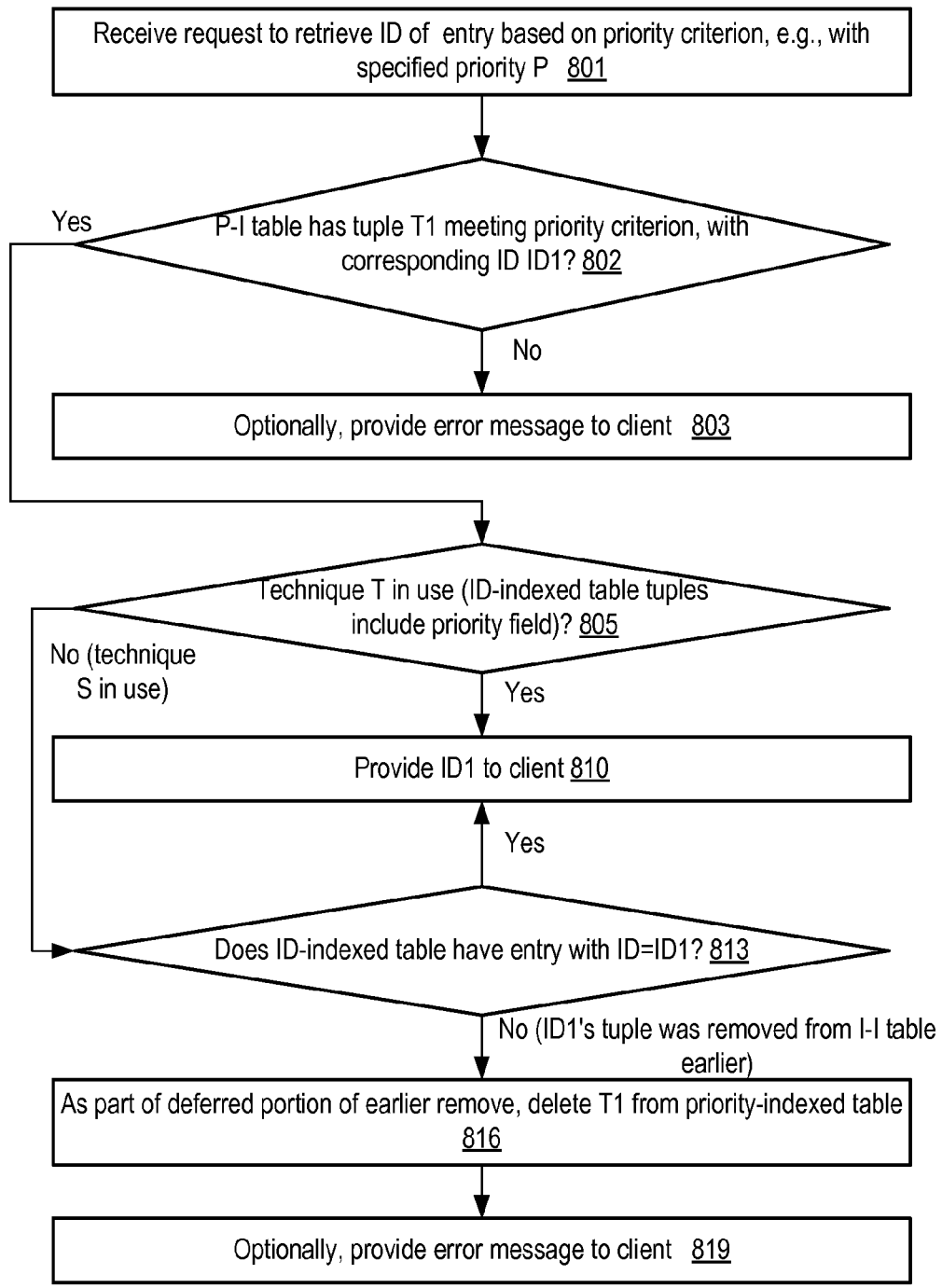
FIG. 8 is a flow diagram illustrating aspects of operations that may be performed to retrieve the identifier of a queue entry with a specified priority from a priority queue instance, according to at least some embodiments.

In some embodiments, in addition to retrieval requests for the highest-priority entries, requests to retrieve the IDs of queue entries based on other priority criteria may be supported. FIG. 8 is a flow diagram illustrating aspects of operations that may be performed to retrieve the identifier of the queue entry with a specified priority P (e.g., not necessarily the highest priority as in the case of FIG. 7) among the entries in a priority queue instance, according to at least some embodiments. As shown in element 801, such a request, which may be termed a RETRIEVE-BY-PRIORITY request, may be received, e.g., by the priority manager 180 via one of the programmatic interfaces 190. As shown in element 802, the queue manager may determine whether the P-I table contains a tuple with priority P. If such a tuple is found, its ID value ID1 may be obtained. If no such tuple is found, an optional error message may be returned to the requesting client (element 803).

As in the case of FIG. 7, subsequent operations may depend on the implementation in use, e.g., on whether technique S or technique T is being employed. If technique T is in use, or if tuples in the I-I table contain priority value fields usable to immediately remove corresponding tuples of the P-I table in response to REMOVE-BY-ID requests (as detected in element 805), ID1 may be immediately returned to the requesting client (element 810), as there would be no need to check for any deferred removals. If technique S is in use, e.g., if deferred removals from the P-I table as described above are being implemented (as also detected in element 805), the I-I table may be checked to determine whether a tuple with ID equal to ID1 exists in the I-I table. If such a tuple exists (as detected in element 813), this may confirm that the tuple T1 does not require a deferred removal, and its ID (ID1) may be returned to the requesting client (element 810).

If, however, the check of the I-I table reveals that no corresponding tuple exists in the I-I table (as also determined in element 813), this means that a REMOVE-BY-ID specifying ID1 was received earlier. Accordingly, T1 may be removed from the P-I table as part of a deferred portion of the earlier removal (element 816). In some embodiments, an error message may be provided to the client, indicating for example that the entry with the specified priority does not exist in the queue instance (element 819).

It is noted that in various embodiments, the operations illustrated in the flow diagrams of FIG. 4, 5, 6, 7 or 8 may be performed in a different order than that shown, or some operations may be performed in parallel. In some embodiments some of the operations illustrated in FIG. 4-FIG. 8 may be omitted. For example, in embodiments in which only technique S is implemented, the operations corresponding to determining whether technique S or technique T is in use may be omitted, and the operations corresponding to the implementation of technique T alone may also be omitted. Similarly, in embodiments in which only technique T is implemented, the operations corresponding to determining whether technique S or technique T is in use may be omitted, and the operations corresponding to the implementation of technique S alone may be omitted. In some embodiments, in which the priority queue management system changes the priority values from those initially indicated by the clients (e.g., in order to ensure that each queue entry has a unique priority value as mentioned earlier), and the clients are not aware of the priority value assigned by the system, clients may not be able to submit requests based on specific priority values. Similarly, clients may not specify priority values at all in some embodiments, and the system may assign priorities to queue entries based on factors such as entry insertion request time (e.g., in one implementation, if an insertion request for an entry E1 is received at time T1, while an insertion request for an entry E2 is received at time T2 later than T1, if the requests do not indicate priorities for the entries, the system may be configured to automatically assign E1 a higher priority than E2). In at least some such embodiments in which clients may not know specific priority values, operations corresponding to FIG. 8 may not be implemented.

Use Cases

The techniques described above, of providing support for efficient priority queues using single-index tables, may be useful in a variety of different scenarios. For example, in some provider networks configured to support a variety of network-accessible services, one of the services already being provided may comprise an efficient I/O-provisioned single-index-per-table database. In such an environment, a priority queue mechanism of the type described above may be built and tested with relatively low cost using the preexisting database service. The mechanism may be used for a variety of applications, including for example work distribution applications in which tasks are generated, prioritized and placed on a queue instance for consumption by worker threads, or for large-scale data analysis or scientific computations that can be broken down into smaller prioritized tasks.

Illustrative Computer System

Figure 9:
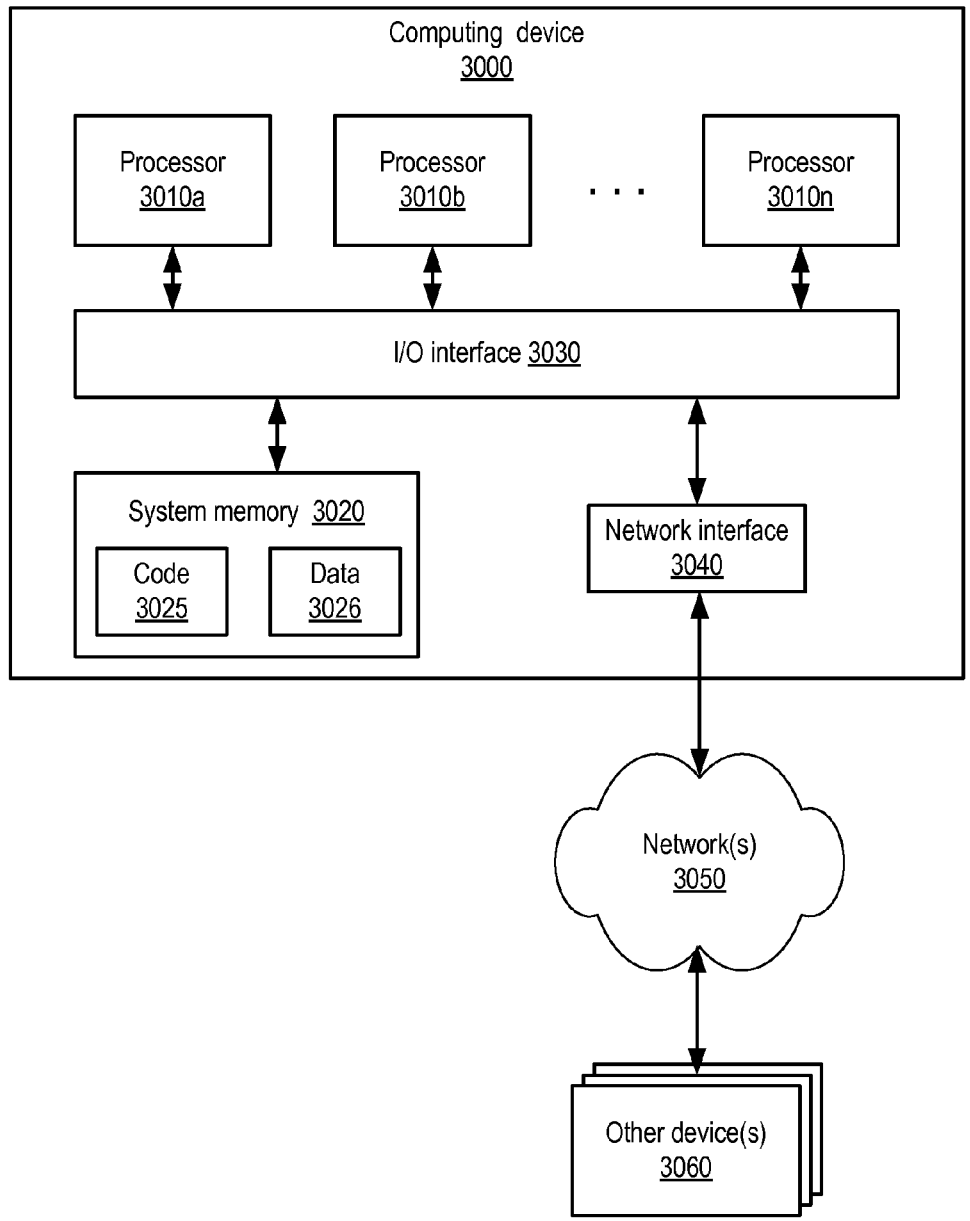
FIG. 9 is a block diagram illustrating an example computing device that may be used in at least some embodiments.

In at least some embodiments, a server that implements a portion or all of one or more of the technologies described herein, including the techniques to implement the various components of priority queue management system 100 such as the queue manager 180 and the database 102, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, including various devices serving as clients, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more hardware computing devices configured to:
in response to a request to generate an instance of a priority queue using a provisioned-input-output (provisioned-I/O) database that permits no more than one index per database table, configure an identifier-indexed table and a priority-indexed table in the database, wherein each queue entry of the instance is represented by a pair of tuples comprising a tuple in the identifier-indexed table and a tuple in the priority-indexed table;
in response to a request to insert a queue entry into the instance, insert one tuple with a corresponding identifier into the identifier-indexed table and one tuple with the corresponding identifier into the priority-indexed table; and
in response to a request to remove a queue entry with a specified identifier from the instance,
identify, using an index lookup of the specified identifier, a first target tuple to be removed from the identifier-indexed table;
remove the first target tuple from the identifier-indexed table; and
defer a removal of a second target tuple from the priority-indexed table until, in response to a request to retrieve an identifier of a queue entry based at least in part on a priority criterion, a determination is made that the first target tuple has been removed from the identifier-indexed table.

2. The system as recited in claim 1, wherein the one or more hardware computing devices are further configured to:
in response to a request to generate a different instance of a priority queue, configure a different identifier-indexed table and a different priority-indexed table in the database, wherein each queue entry of the different instance is represented by a pair of tuples comprising a tuple in the different identifier-indexed table and a tuple in the different priority-indexed table;
in response to a request to insert a queue entry into the different instance, insert one tuple comprising a priority value into the different identifier-indexed table and one tuple into the different priority-indexed table; and
in response to a request to remove a queue entry with a specified identifier from the different instance,
identify a third target tuple to be removed from the different identifier-indexed table; and
in response to determining that contents of the third target tuple can be used to identify, via an index lookup, a fourth target tuple to be deleted from the different priority-indexed table, remove the third target tuple from the different identifier-indexed table and the fourth target tuple from the different priority-indexed table.

3. The system as recited in claim 1, wherein the one or more hardware computing devices are configured to:
in response to a request to retrieve an identifier of a queue entry based at least in part on a particular priority criterion,
identify a particular tuple corresponding to the particular priority criterion within the priority-indexed table, wherein the particular tuple includes a particular identifier;
determine whether the identifier-indexed table includes a tuple with the particular identifier;
in response to determining that the identifier-indexed table includes a tuple with the particular identifier, provide an indication of the particular identifier; and
in response to determining that the identifier-indexed table does not include a tuple with the particular identifier, remove the particular tuple from the priority-indexed table.

4. The system as recited in claim 3, wherein the request to retrieve the identifier indicates that the identifier of the queue entry with the highest priority among the queue entries of the instance is to be retrieved, and wherein, in response to determining that the identifier-indexed table does not include a tuple with the particular identifier, the one or more hardware computing devices are further configured to:
after removing the particular tuple from the priority-indexed table,
identify, from among the tuples of the priority-indexed table, a different tuple with a different identifier such that (a) the identifier-indexed table includes a tuple with the different identifier and (b) the different tuple has a higher priority than any other tuple in the priority-indexed table; and
provide an indication of the different identifier.

5. The system as recited in claim 1, wherein, in response to the request to insert the queue entry into the instance, the one or more hardware computing devices are further configured to:
determine a unique value for at least a priority field of the tuple inserted into the priority-indexed table, using one or more of (a) a timestamp (b) a sequence number or (c) a random string.

6. The system as recited in claim 1, wherein the one or more hardware computing devices are further configured to:
provide to a client, and indication of a cost associated with one or more types of queue operations, wherein the cost is expressed in units of I/O operations.

7. A method, comprising:
configuring, in response to a request to generate an instance of a priority queue using a database that permits no more than one index per database table, an identifier-indexed table and a priority-indexed table in the database, wherein each queue entry of the instance is represented by a pair of tuples comprising a tuple in the identifier-indexed table and a tuple in the priority-indexed table;
in response to a request to insert a queue entry into the instance, inserting one tuple with a corresponding identifier into the identifier-indexed table and one tuple with the corresponding identifier into the priority-indexed table; and
in response to a request to remove a queue entry with a specified identifier from the instance,
identifying, using the specified identifier, a first target tuple to be removed from the identifier-indexed table; and
removing the first target tuple from the identifier-indexed table;
wherein a removal of a second target tuple corresponding to the queue entry from the priority-indexed table is deferred until, in response to a request to retrieve an identifier of a queue entry based at least in part on a priority criterion, a determination is made that the first target tuple has been removed from the identifier-indexed table.

8. The method as recited in claim 7, further comprising:
in response to a request from a client to retrieve an identifier of a queue entry based on a particular priority criterion from the instance,
identifying a particular tuple corresponding to the particular priority criterion within the priority-indexed table, wherein the particular tuple includes a particular identifier;
determining whether the identifier-indexed table includes a tuple with the particular identifier;
in response to determining that the identifier-indexed table includes a tuple with the particular identifier, providing an indication of the particular identifier; and
in response to determining that the identifier-indexed table does not include a tuple with the particular identifier, removing the particular tuple from the priority-indexed table.

9. The method as recited in claim 8, wherein the request to retrieve the identifier indicates that the identifier of the queue entry with the highest priority among the queue entries of the instance is to be retrieved, and wherein, in response to determining that the identifier-indexed table does not include a tuple with the particular identifier, the method further comprises:
after removing the particular tuple from the priority-indexed table,
identifying, from among the tuples of the priority-indexed table, a different tuple with a different identifier such that (a) the identifier-indexed table includes a tuple with the different identifier and (b) the different tuple has a higher priority than any other tuple in the priority-indexed table; and
providing an indication of the different identifier.

10. The method as recited in claim 7, further comprising:
deferring the removal of the second target tuple from the priority-indexed table until (a) a request to retrieve an identifier of a queue entry based on a priority criterion from the instance is received, and (b) in response to the request to retrieve the identifier, a determination is made that the first target tuple has been removed from the identifier-indexed table.

11. The method as recited in claim 7, wherein the database comprises an I/O-provisioned database.

12. The method as recited in claim 7, further comprising:
providing, to a client, an indication of the number of I/O operations required to perform one or more queue management operations.

13. The method as recited in claim 7, wherein the database comprises a key-value store in which, within a particular table comprising a particular tuple and a different tuple, the particular tuple comprises a different set of fields than the different tuple.

14. A method, comprising:
configuring, in response to a request to generate an instance of a priority queue using a database that permits no more than one index per database table, an identifier-indexed table and a priority-indexed table in the database, wherein each queue entry of the instance is represented by a pair of tuples comprising a tuple in the identifier-indexed table and a tuple in the priority-indexed table;
in response to a request to insert a queue entry into the instance, inserting one tuple with a corresponding identifier into the identifier-indexed table and one tuple with the corresponding identifier into the priority-indexed table; and in response to a request to remove a queue entry with a specified identifier from the instance,
identifying, using the specified identifier, a first target tuple to be removed from the identifier-indexed table;
determining, using contents of the first target tuple, a priority value usable for an index-based lookup of a second target tuple to be removed from the priority-indexed table; and
removing the first target tuple from the identifier-indexed table and the second target tuple from the priority-indexed table.

15. A non-transitory computer-accessible storage medium storing program instructions that when executed on one or more processors implement a priority queue service configured to:
in response to a request to establish a priority queue instance, configure an identifier-indexed table and a priority-indexed table in a database, wherein each queue entry of the instance is represented by a pair of tuples comprising a tuple with a corresponding identifier in the identifier-indexed table and a tuple with the corresponding identifier in the priority-indexed table; and
in response to a request to remove a queue entry with a specified identifier from the instance,
identify, using the specified identifier, a first target tuple to be removed from the identifier-indexed table;
in response to determining that contents of the first target tuple can be used to access, using an index lookup, a second target tuple to be deleted from the priority-indexed table, remove the first target tuple from the identifier-indexed table and the second target tuple from the priority-indexed table; and
in response to determining that contents of the first target tuple cannot be used to access the second target tuple using an index lookup, remove the first target tuple from the identifier-indexed table and defer a removal of the second target tuple until, in response to a request to retrieve an identifier of a queue entry based at least in part on a priority criterion, a determination is made that the first target tuple has been removed from the identifier-indexed table.

16. The non-transitory computer-accessible storage medium as recited in claim 15, wherein the priority queue service is configured to:
in response to a request from a client to retrieve an identifier of a queue entry based at least in part on a particular priority criterion from the instance,
identify a particular tuple corresponding to the particular priority criterion within the priority-indexed table, wherein the particular tuple includes a particular identifier;
determine whether the identifier-indexed table includes a tuple with the particular identifier;
in response to determining that the identifier-indexed table includes a tuple with the particular identifier, provide an indication of the particular identifier to the client; and
in response to determining that the identifier-indexed table does not include a tuple with the particular identifier, remove the particular tuple from the priority-indexed table.

17. The non-transitory computer-accessible storage medium as recited in claim 16, wherein the request from the client to retrieve the identifier indicates that the identifier of the queue entry with the highest priority among the queue entries of the instance is to be retrieved, and wherein, in response to determining that the identifier-indexed table does not include a tuple with the particular identifier, the priority queue service is configured to:

after removing the particular tuple from the priority-indexed table, identify, from among the tuples of the priority-indexed table, a different tuple with a different identifier such that (a) the identifier-indexed table includes a tuple with the different identifier and (b) the different tuple has a higher priority than any other tuple in the priority-indexed table; and provide an indication of the different identifier to the client.

18. The non-transitory computer-accessible storage medium as recited in claim 15, wherein in response to determining that contents of the first target tuple cannot be used to access the second target tuple using an index lookup, the priority queue service is configured to:

defer the removal of the second target tuple from the priority-indexed table until (a) a request to retrieve an identifier of a queue entry according to a particular priority criterion from the instance is received, and (b) in response to the request to retrieve the identifier, a determination is made that the first target tuple has been removed from the identifier-indexed table.

19. The non-transitory computer-accessible storage medium as recited in claim 15, wherein the priority queue service is configured to in response to a request to insert a queue entry into the instance, insert one tuple into the identifier-indexed table and one tuple into the priority-indexed table.

20. The non-transitory computer-accessible storage medium as recited in claim 19, wherein, in response to the request to insert the queue entry into the instance, the priority queue service is further configured to:

determine a unique value for a priority field of the tuple inserted into the priority-indexed table.

21. The non-transitory computer-accessible storage medium as recited in claim 20, wherein, to determine the unique value, the priority queue service is further configured to:

determine at least a portion of the unique value using one or more of: (a) a timestamp, (b) a sequence number or (c) a unique random string.

\* \* \* \* \*